United States Patent

Wan

[11] Patent Number: 5,513,918
[45] Date of Patent: May 7, 1996

[54] ROLLER ELEMENT BEARING WITH WATER REPELLENT FILTER SEAL

[75] Inventor: George T. Y. Wan, Houten, Netherlands

[73] Assignee: SKF Industrial Trading and Development Company B.V., Nieuwegein, Netherlands

[21] Appl. No.: 354,896

[22] Filed: Dec. 9, 1994

[30] Foreign Application Priority Data

Dec. 28, 1993 [NL] Netherlands ............................ 9302277

[51] Int. Cl.$^6$ ................................................. F16C 33/76
[52] U.S. Cl. ........................ 384/477; 210/171; 210/490; 210/502.1; 210/506; 277/23
[58] Field of Search ............................ 384/477; 210/171, 210/314, 490, 502.1, 506, 510.1; 277/23

[56] References Cited

U.S. PATENT DOCUMENTS

| | | | |
|---|---|---|---|
| 4,618,388 | 10/1986 | Ayers | 210/502.1 |
| 4,707,269 | 11/1987 | Ohue et al. | 210/806 |
| 4,846,592 | 7/1989 | Tsumori et al. | |
| 4,848,776 | 7/1989 | Winckler | 277/23 |
| 5,112,478 | 5/1992 | Mohr | 210/502.1 |
| 5,120,440 | 6/1992 | Nemoto et al. | 210/490 |

FOREIGN PATENT DOCUMENTS

| | | |
|---|---|---|
| 0248572 | 12/1987 | European Pat. Off. . |
| 0267632 | 5/1988 | European Pat. Off. . |
| 0301139 | 2/1989 | European Pat. Off. ............. 210/502.1 |
| 2029429 | 1/1971 | Germany . |
| 59-32906 | 2/1984 | Japan ...................................... 210/506 |
| 64-38118 | 2/1989 | Japan ................................. 210/502.1 |

*Primary Examiner*—Peter A. Hruskoci
*Assistant Examiner*—Theodore M. Green
*Attorney, Agent, or Firm*—Young & Thompson

[57] ABSTRACT

A rolling element bearing, comprising bearing rings with rolling elements between the bearing rings, and a filter seal extending between the rings for closing a space between the rings. Said filter seal is oil permeable and water repellant. Hydrophilic chemicals are grafted on the side of the filter material facing the rolling elements. The side of the filter material opposite the rolling elements is coated with a water repellant substance having a high contact angle. The filter material is a metal mesh or a microporous polymeric material.

7 Claims, 1 Drawing Sheet

ROLLER ELEMENT BEARING WITH WATER REPELLENT FILTER SEAL

FIELD OF THE INVENTION

The invention relates to a filter seal which is capable of passing oil and of removing contaminations from said oil, comprising a layer of filter material which is oil-permeable.

BACKGROUND OF THE INVENTION

Such filter seals are for instance applied in rolling element bearings for use in an oil splash environment, e.g. in a gear box. In order to provide an appropriate lubrication, oil may enter the bearing space through the filter seal, whereby contaminations such as wear particles from the moving components such as tooth gears may be filtered out. An example of such filter seal is shown in GB-A-1319953.

Apart from wear particle contaminations, water contamination is a matter of concern as well. Water contaminant in oil exerts a detrimental effect on bearing life in particular. The negative effects thereof have often been attributed to the mechanism of hydrogen embrittlement.

OBJECT OF THE INVENTION

The object of the invention is therefore to provide a filter seal which is capable of removing any water contaminant which is contained in oil.

SUMMARY OF THE INVENTION

This object is achieved in that the filter material is water repellent. Any small water droplets or water particles are rejected by the water repellent nature of the filter material. The pressure required to force such water droplets through the filter material depends on the surface tension and inversely on the size of the filter pores. These properties of the filter material are selected in such a way that at the prevailing pressure conditions no ingress of water will take place.

Although the above water repellent filter material is suitable for removing the bulk of water contained in the oil, nevertheless some very tiny water particles or water molecules might still pass through. In order to prevent such particles or even molecules from entering the bearing space, hydrophilic means are also provided. Any water particles or molecules which might pass through the water repellent filter layer, are now absorbed by the hydrophilic means and are there kept from entering the protected area, i.e. the bearing space.

Preferably, hydrophilic chemicals are grafted onto the surface of the layer of filter material. In order to obtain the best effect, the hydrophilic chemicals are situated at the side of the layer of filter material facing away from the contaminated oil.

In another embodiment, the hydrophilic chemicals are incorporated into filter matrices.

The filter material is preferably coated with a water repellent substance having a high contact angle. The filter material may be a metal mesh or a microporous polymeric material.

BRIEF DESCRIPTION OF THE DRAWINGS

The invention will be explained further with reference to an embodiment shown in the drawings.

Figure 1:
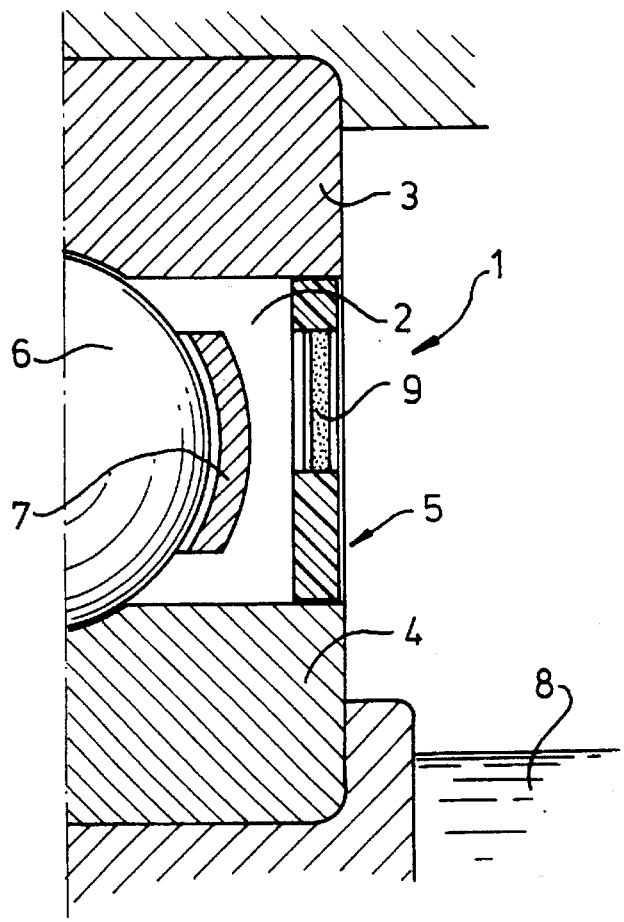
FIG. 1 shows a rolling element bearing provided with a filter seal according to the invention.

A rolling element bearing 1 has an inner bearing space 2 which is delimited by outer ring 3, inner ring 4 and filter seal 5. The inner bearing space contains a number of rolling elements 6, held in cage 7.

The rolling element bearing 1 is contained in a housing which is provided with an amount of oil 8.

The housing may for instance be a gear box. In service, the oil 8 is splashed by the action of the gears, which means that oil droplets splash onto the bearing 1 and the filter seal 5. Thereby, oil may enter the inner bearing space 2 via the sealing element 9 of filter seal 5.

Figure 2:
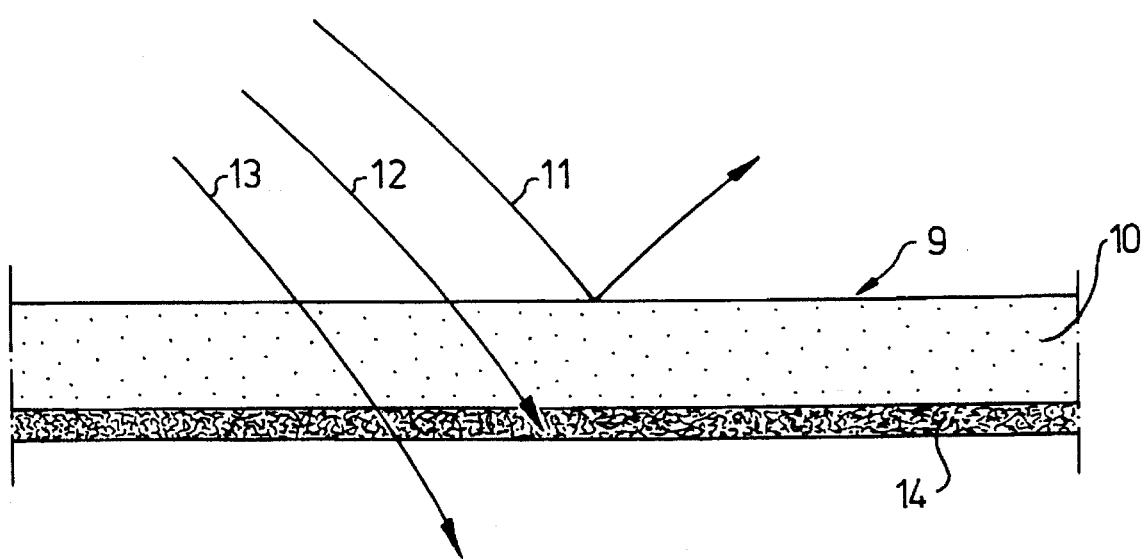
FIG. 2 shows a cross-section, on an enlarged scale, of the filter seal according to the invention.

FIG. 2 shows, on an enlarged scale, this sealing element 9 in cross-section. It consists of a porous filter element 10, for instance a microporous membrane. Any water droplets contained in the oil are rejected by the membrane 10, as indicated by arrow 11. This rejection of water droplets is caused by the water repellent coating applied to the surfaces of membrane 10.

Very small water particles, for instance water molecules, may however penetrate membrane 10. In order to avoid the ingress of such very small water particles into the inner bearing space, a hydrophilic layer 14 is provided. Any water molecules which cross the membrane 10, are adsorbed in said hydrophilic layer as indicated by arrow 12.

Thus, the inner bearing space 2 is protected very well against penetrating water or even water molecules, in such a way that only clean oil is passed, as indicated by arrow 13.

I claim:

1. A rolling element bearing, comprising bearing rings with rolling elements between the bearing rings, and a filter seal extending between the rings for closing a space between the rings, said filter seal comprising a layer of filter material which is both oil permeable and water repellant.

2. A bearing as claimed in claim 1, and hydrophilic means on the side of the filter material facing the rolling elements.

3. A bearing as claimed in claim 2, in which said hydrophilic means comprise hydrophilic chemicals grafted onto the surface of the layer of filter material.

4. A bearing as claimed in claim 2, in which the hydrophilic chemicals are incorporated into filter matrices.

5. A bearing as claimed in claim 2, wherein the side of the filter material opposite the rolling elements is coated with a water repellant substance having a high contact angle.

6. A bearing as claimed in claim 2, in which the filter material is a metal mesh.

7. A bearing as claimed in claim 2, in which the filter material is a microporous polymeric material.

* * * * *